Nov. 12, 1935.  E. T. HIGHT  2,020,888
HOISTING APPARATUS
Filed Aug. 25, 1934   2 Sheets-Sheet 1

Inventor
Everett T. Hight.

By
J. D. Bryant
Attorney

Nov. 12, 1935.   E. T. HIGHT   2,020,888
HOISTING APPARATUS
Filed Aug. 25, 1934   2 Sheets-Sheet 2

Inventor
Everett T. Hight
By
F. K. Bryant
Attorney

Patented Nov. 12, 1935

2,020,888

UNITED STATES PATENT OFFICE 2,020,888

HOISTING APPARATUS

Everett T. Hight, Oklahoma City, Okla.

Application August 25, 1934, Serial No. 741,479

4 Claims. (Cl. 212—68)

This invention relates to improvements in hoisting apparatus capable of being operated by power taken from a tractor motor.

The primary object of this invention is to provide a hoisting apparatus including a wheeled frame having a turn-table thereon provided with means for rotating the turn-table to the right or left capable of making a complete revolution either to right or left by manipulating clutches to operate suitable gearing.

A further object of this invention is to provide a hoisting device which may be easily attached to a tractor for the purpose of operating clam shell buckets, dredging devices or other hoisting apparatus.

A still further object of this invention is to provide a wheeled frame adapted to be attached to a conventional tractor having a vertical power shaft connected to the tractor power take-off through suitable sprocket wheels and chains trained thereover whereby the upper portion of the vertical power shaft may be provided with gears for the purpose of operating winding devices such as drum pulleys.

A still further object of this invention is to provide a hoisting device which is compact and may be easily detached from the tractor so that the tractor may be used for other purposes when so desired.

Figure 1:
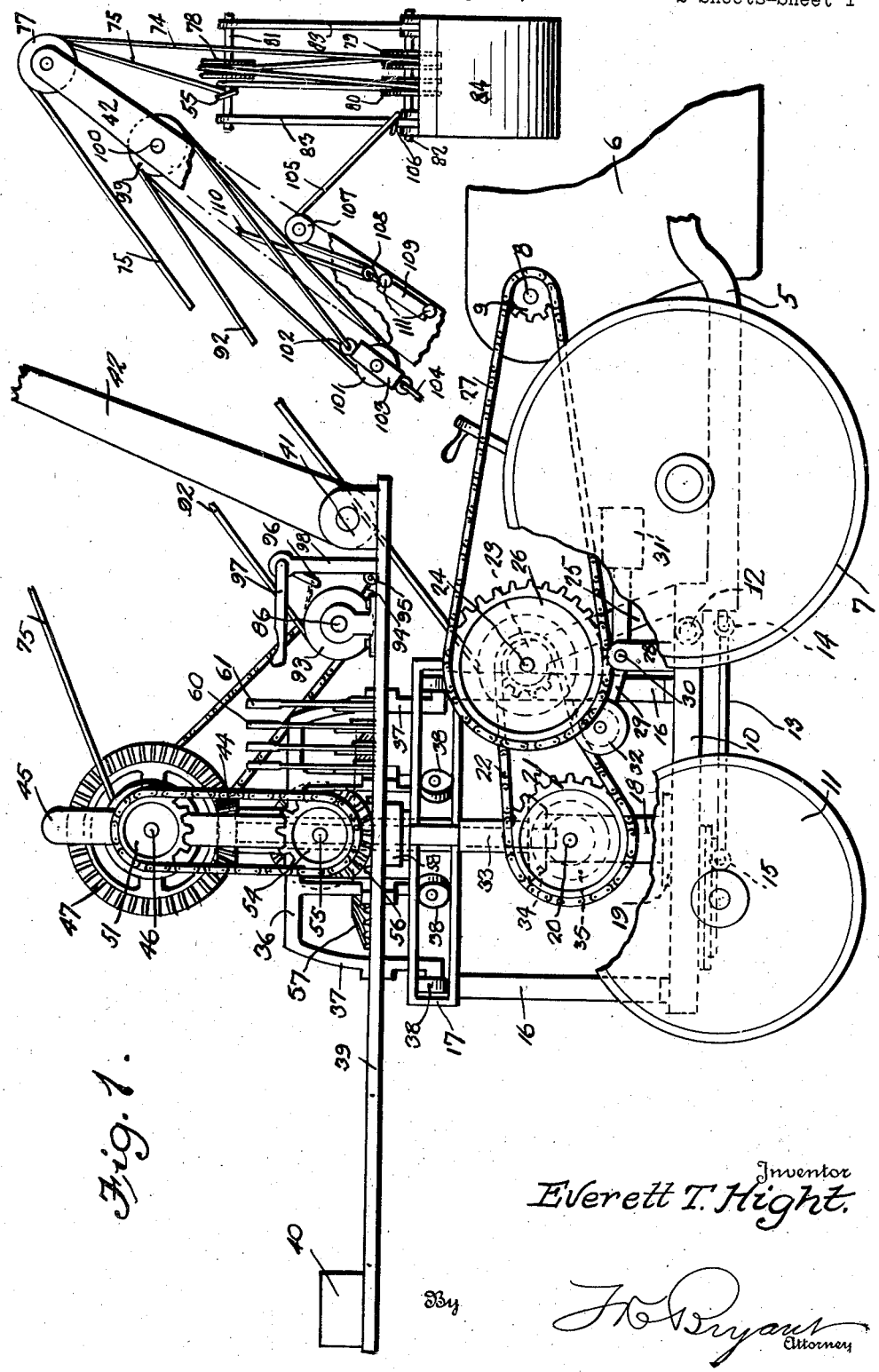
Figure 2:
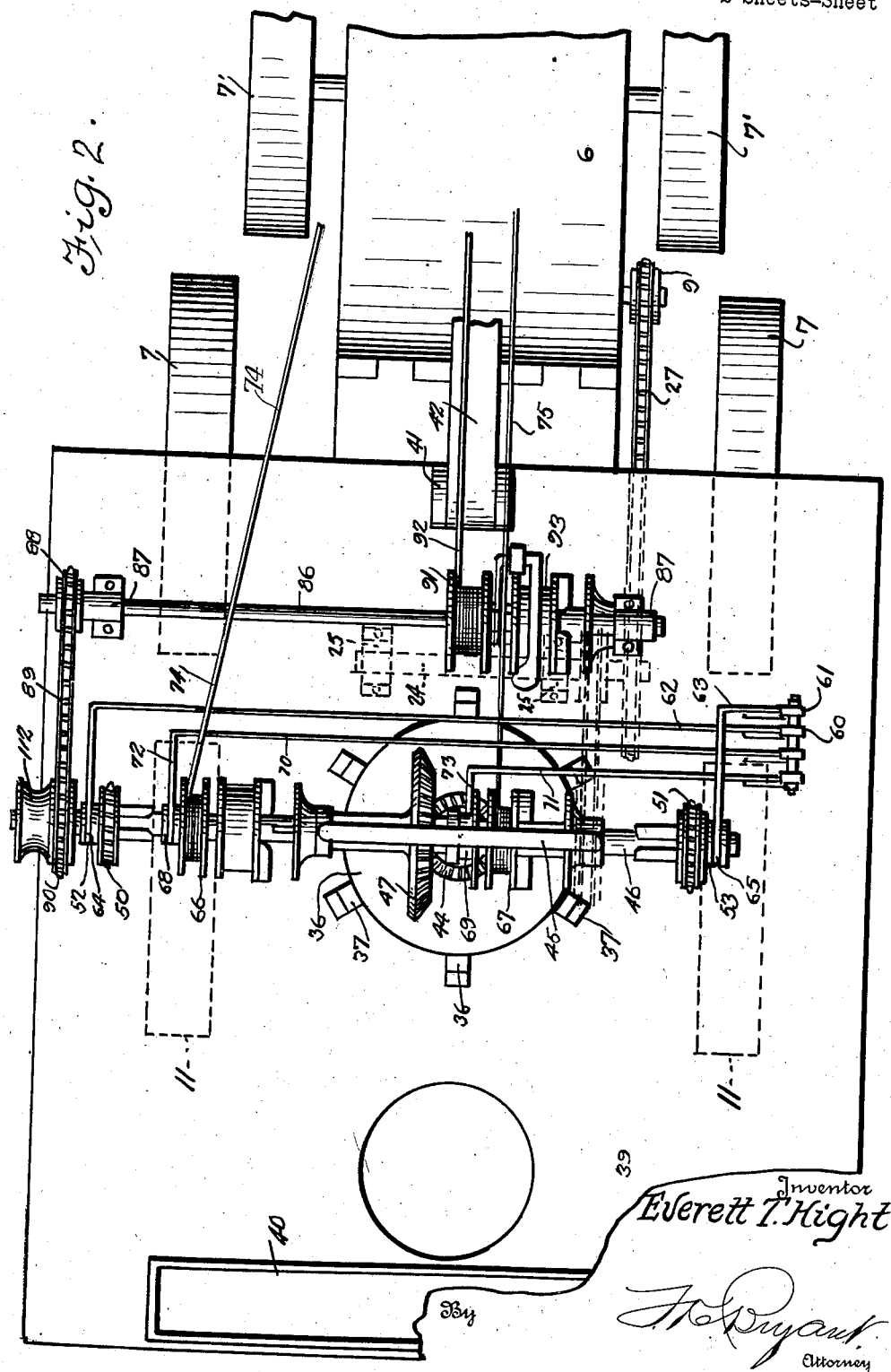

Other objects and advantages of the invention will become apparent during the course of the following description, taken with the drawings, wherein, Figure 1 is a side elevational view of the device embodying this invention, illustrating the same attached to a power tractor; and Figure 2 is a top elevational view of device embodying this invention, illustrating the turn-table platform and further manner in which the device is arranged with respect to the motor tractor.

In the drawings, wherein for the purpose of illustrating the invention and wherein like reference characters will be employed to designate like parts throughout the same, the reference character 5 will generally be employed to designate the wheeled frame of a tractor 6 supported in the rear by wheels 7, and in the front by the usual steering wheel 7'. A power take-off shaft 8 is provided with a sprocket wheel 9 in lieu of the usual belt pulley.

The invention comprises a wheeled frame 10 supported by wheels 11 secured to the tractor frame 5 as at 12 and adapted to be braced as at 13 by means of a bar having one end 14 connected with the tractor frame 5, while the opposite end is connected to the axle 15 of the wheel 11.

Mounted upon the wheel frame 10 are a series of vertical supports 16 for supporting a circular track 17. Also supported on the wheeled frame 10 is a vertical tubular base member 18 having a flanged portion 19 which is riveted or bolted to the base 10 to produce a rigid structure. Extending through the base 18 is a horizontal rotary shaft 20 provided with a sprocket wheel 21 having trained therearound a sprocket chain 22 which passes over and around a sprocket wheel 23 rigidly connected to a shaft 24 supported by rearwardly extending supports 25 carried by the tractor frame 5. Also rigidly secured to the shaft 24 is a sprocket wheel 26 adapted to be driven by the power take-off sprocket 9 on the tractor 6 by means of a sprocket chain 27 passing therearound. A vertical support 28 is secured to the wheeled frame 10 and is adapted to support a pivoted lever 29 as at 30 on one end of which is mounted a weight 31 and on the other end is mounted a pulley 32 for the purpose of tightening the chain 22 by bearing against the same and placing a certain amount of tension on the sprocket chain 22.

Rotatably mounted within the tubular base member 18 is a shaft 33 having secured to the lower end thereof a bevel gear 34 adapted to mesh with a bevel gear 35 rigidly secured to the rotary shaft 20. The upper end of the vertical shaft 33 is journalled in a spider frame 36 having downwardly extending spider arms 37 provided with rollers 38 adapted to be guided in the circular track 17.

Secured to the spider frame 36 is a platform 39 having a counter-weight 40 on one end and supporting journals 41 for a swinging boom 42 on the opposite end.

Also secured to the upper end of the vertical shaft 33 is a bevel gear 44.

Secured to the spider frame 36 is a U-shaped shaft hanger 45 which forms a support for a horizontal rotary shaft 46 upon which is rigidly secured a bevel gear 47 adapted to mesh with the bevel gear 44 for the purpose of rotating the shaft 46.

The shaft 46 is provided at each end with sprocket wheels 50 and 51 connected to the shaft by means of suitable sliding clutches 52 and 53. Mounted directly below the sprocket wheels 50 and 51 are corresponding sprocket wheels 54 mounted upon stub shafts 55 journalled in the spider frame 36.

On each end of the horizontal shafts 55 there are provided bevel gears 56 adapted to mesh with a bevel gear 57 having corresponding teeth and being secured rigidly to the track frame 17 by means of a bushing 58. It will now be observed that by rotating one of the sprockets 51 or 50 at a time, said turn-table platform 39 may be rotated with respect to the wheeled frame 10 upon the circular track 17, since the gear 57 is held stationary with the circular track 17 by reason of the connecting collar 58.

Pivoted control levers 60 and 61 are provided for controlling the clutches 52 and 53 to connect and disconnect the sprocket wheels 50 and 51 to the shaft 46. Said pivoted hand levers 60 and 61 are secured to the platform 39 and are provided with control rods 62 and 63 respectively having the open ends 64 and 65 for the purpose of engaging the yoked collars formed on the clutch sections which are slidably mounted upon the shaft 46.

Also secured to the horizontal shaft 46 are drums 66 and 67 having sliding clutches 68 and 69 respectively which are adapted to be controlled by the clutch rods 70 and 71 having angle portions 72 and 73 provided with yokes for engaging the clutch collars after a fashion similar to the clutches 52 and 53. Coiled around each of the windlass drums 66 and 67 are cables 74 and 75 adapted to extend to the top of the boom 42 and pass over a pair of pulleys 77. The cable 74 is adapted to be trained around pulleys 78, 79 and 80 mounted upon shafts 81 and 82 carried by the clam shell bucket frame 83 whereby the clam shells 84 may be opened and closed in the usual fashion.

The other cable 75 may have its end connected as at 55 for facilitating the raising and lowering of the clam shell bucket 84.

For the purpose of raising and lowering the boom 42 a shaft 86 is provided on the platform 39 and has its ends journalled in bearings 87 and is provided at one end with a sprocket wheel 88 having a sprocket chain 89 adapted to be trained over a sprocket wheel 90 rigidly secured to the horizontal shaft 46. Loosely mounted upon the shaft 86 is a windlass drum 91 around which is coiled a cable 92 and means is provided for connecting the windlass drum 91 to the rotary shaft 86 and includes a clutch very similar to the clutches 52, 53, 68 and 69 and may be operated manually after the same fashion. In addition there is provided a drum 93 around which is passed the belt 94 having one end anchored to the platform as at 95, while the opposite end is connected to an arm 96 of a bell crank lever 97 rotatably mounted upon a support 98. In this manner windlass drum 91 may be held in a locked position after the boom 42 has been raised or lowered to the desired position. The drum 91 also contains a latch device including a pawl and ratchet wheel adapted to automatically prevent its reverse rotation unless the pawl is released by a lever against the action of a retention device.

Any form of clutch may be employed for connecting the windlass drum 91 to the shaft 86 and such cable 92 may have its ends connected to a double sheave pulley 99 secured to a spindle 100 mounted between the boom 42. The cable 92 may be trained over the double sheave block 99 and may encircle a pulley block 101 so that the free end as at 102 may be connected to the pulley sheave 103 that has an adjustable connection 104 with the platform 39 for holding the boom in the desired position by means of the cable 42.

Means is provided for preventing the successive swinging of the clam shell bucket 85 while being raised and lowered by the cables 74 and 75 and said means includes a cable 105 having one of its ends secured to the clam shell bucket frame 83 as at 106. The cable 105 is trained over a pulley 107 and passes around a pulley 108 secured to a weighted member 109 and the free end of the cable 105 may be anchored to the boom also as at 110. The weight 109 may be provided with rollers 111 for sliding in the channel portion of the boom 42.

The pulley 112 may be secured to the horizontal shaft 46 for the purpose of pulling or lifting objects by coiling a rope therearound and tying the free end of the rope onto the opposite end of the object. Power may also be taken from the pulley 112 for operating a circular saw machine or a grinding machine.

It is to be understood that the hoisting mechanism above described may be secured to a truck, caterpillar tractor receiving its power from the transmission gearing or the hoisting device may be mounted on a stationary support, barge or boat and that gas, steam, or electricity may be employed as the motive force for the hoisting mechanism.

It is also to be understood that the clutch as shown may be substituted by other forms of clutches and that the form of the invention herewith shown and described is to be taken as the preferred embodiment of the same, also that various changes in the shape, size and arrangement of parts may be resorted to without departing from the spirit of the invention or the scope of the sub-joined claims.

I claim:—

1. A hoisting machine comprising a wheeled frame, a circular track mounted on the frame, a vertical shaft rotatably mounted on the frame, means for rotating the shaft, a turn-table mounted on the circular track, a pair of superposed horizontal shafts journalled on the turntable, operative connections between the vertical shaft and the upper horizontal shaft, operative connections between the two horizontal shafts, and operative connections between the lower horizontal shaft and turn-table for effecting rotation of the latter, the mounting for the turn-table including a spider frame having rollers at its lower end working on the circular track, and depending legs of the spider frame supporting the turn-table and lower horizontal shaft.

2. A hoisting machine comprising a wheeled frame, a circular track mounted on the frame, a vertical shaft rotatably mounted on the frame, means for rotating the shaft, a turn-table mounted on the circular track, a pair of superposed horizontal shafts journalled on the turn-table, operative connections between the vertical shaft and the upper horizontal shaft, operative connections between the two horizontal shafts, and operative connections between the lower horizontal shaft and turn-table for effecting rotation of the latter, the turn-table rotating means including a ring gear fixed to the circular track, bevel gears loosely mounted on the lower horizontal shaft respectively engaged with opposite sides of the ring gear and means for selectively keying the bevel gears to the shaft, the mounting for the turn-table including a spider frame having rollers at its lower end working on the circular track, and depending legs of the spider frame supporting the turn-table and lower horizontal shaft.

3. A hoisting machine comprising a wheeled frame, a circular track mounted on the frame, a vertical shaft rotatably mounted on the frame, means for rotating the shaft, a turn-table mounted on the circular track, a pair of superposed horizontal shafts journalled on the turn-table, operative connections between the vertical shaft and the upper horizontal shaft, operative connections between the two horizontal shafts, and operative connections between the lower horizontal shaft and turn-table for effecting rotation of the latter, the connection between the vertical and upper horizontal shaft including bevel gears and the connection between the two horizontal shafts including chain and sprocket drives, the mounting for the turn-table including a spider frame having rollers at its lower end working on the circular track, and depending legs of the spider frame supporting the turn-table and lower horizontal shaft.

4. A hoisting machine comprising a wheeled frame, a circular track mounted on the frame, a vertical shaft rotatably mounted on the frame, means for rotating the shaft, a turn-table mounted on the circular track, a pair of superposed horizontal shafts journalled on the turn-table, operative connections between the vertical shaft and the upper horizontal shaft, operative connections between the two horizontal shafts, and operative connections between the lower horizontal shaft and turn-table for effecting rotation of the latter, the turn-table rotating means including a ring gear fixed to the circular track, bevel gears loosely mounted on the lower horizontal shaft respectively engaged with opposite sides of the ring gear and means for selectively keying the bevel gears to the shaft, the connection between the vertical and upper horizontal shaft including bevel gears and the connection between the two horizontal shafts including chain and sprocket drives, the mounting for the turn-table including a spider frame having rollers at its lower end working on the circular track, and depending legs of the spider frame supporting the turn-table and lower horizontal shaft.

EVERETT T. HIGHT.